US006377206B1

United States Patent
Petty (10) Patent No.: US 6,377,206 B1
(45) Date of Patent: Apr. 23, 2002

(54) METHOD FOR CLUTTER REJECTION IN DIGITAL IMAGERY

(75) Inventor: Joe V. Petty, Highlands Ranch, CO (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 09/544,506

(22) Filed: Apr. 6, 2000

(51) Int. Cl.$^7$ ................................................ G01S 7/292
(52) U.S. Cl. ...................... 342/159; 342/175; 342/176; 342/179; 342/195; 342/196
(58) Field of Search .................... 342/25, 26, 159–165, 342/169–176, 179, 190–197; 382/103, 155–161, 173–181, 190–228, 254, 260–269

(56) References Cited

U.S. PATENT DOCUMENTS

| 5,345,242 A | 9/1994 | Roberts et al. ............. 342/159 |
| 5,451,961 A | 9/1995 | Rubin et al. ................ 342/159 |
| 5,539,412 A | 7/1996 | Mendelson ................. 342/159 |
| 5,561,431 A | 10/1996 | Peele et al. .................... 342/90 |
| 5,612,700 A | 3/1997 | Tucker ......................... 342/90 |
| 5,675,663 A | * 10/1997 | Koerner et al. ............. 382/181 |
| 5,790,702 A | * 8/1998 | Yoshimura ................. 382/209 |
| 5,848,193 A | 12/1998 | Garcia ........................ 382/232 |
| 5,867,118 A | 2/1999 | McCoy et al. ................ 342/90 |
| 5,909,190 A | 6/1999 | Lo et al. ...................... 342/159 |
| 6,038,337 A | * 3/2000 | Lawrence et al. .......... 382/156 |

OTHER PUBLICATIONS

Gonzales and Wintz; Principal Component Analysis of Multispectral Imagery; 1977; Chapter 6, pp. 312–316.
Press, Teukolsky, Vetterling and Flannery;1992; Numerical Recipes in FORTRAN; Chapter 13, pp. 584–599.

* cited by examiner

Primary Examiner—Bernarr E. Gregory
(74) Attorney, Agent, or Firm—Marsh Fischmann & Breyfogle LLP (57) ABSTRACT

A method for filtering clutter from a first digital input image is disclosed. Generally, the method includes the steps of applying at least first and second transforms to first digital image data corresponding to the first digital input image, performing an appropriate filtering operation to retain, in first and second transform domains, at least a portion of the transform indications corresponding or at least correlatable to a structure or target in the first digital input image, applying to the remaining transform indications inverse first and second transforms, and processing the filtered first digital input data to produce a single filtered image and/or image data, whereby the target or structure in the first digital input image formerly obscured by the clutter is detectable/recognizable.

24 Claims, 7 Drawing Sheets

Low Order DKLT

Given Ensemble of N x 1 Vectors $$X = \{X_m | m=1,2,\ldots,M\} \rightarrow Z = \{Z_m | m=1,2,\ldots,M\} \rightarrow C_z = \frac{1}{M}\sum_{m=1}^{M} Z_m Z_m^t$$

Common Attributes $\rightarrow \begin{bmatrix} X_{1m} \\ \vdots \\ X_{im} \\ \vdots \\ X_{Nm} \end{bmatrix}$  $Z_{im} = \frac{X_{im} - \bar{X}_i}{S_i^p} \leftrightarrow \begin{bmatrix} Z_{1m} \\ \vdots \\ Z_{im} \\ \vdots \\ Z_{Nm} \end{bmatrix}$ $\lambda_1 > \lambda_2 > \cdots > \lambda_N$ $\vec{e}_1, \vec{e}_2, \ldots, \vec{e}_N$ $E = [\vec{e}_i]_{i=N}^{i=1} \} N \times N$ $m^{th}$ 2 X 2 Block
N = 4

K-L Domain $Y = \{Y_m | m=1,2,\ldots,M\}; \quad E_k = \begin{bmatrix} \vec{e}_1 \\ \vdots \\ \vec{e}_k \\ \vdots \\ \vec{0} \\ \vdots \\ \vec{0} \end{bmatrix} \rightarrow \hat{Z}_m + E_k^t Y_m, m=1,2,\ldots,M \rightarrow$ $= E X_m$

Inverse KLT $\hat{X} = \{\hat{X}_m | m=1,2,\ldots,M\}, \hat{X}_m = \begin{bmatrix} \hat{X}_{1m} \\ \vdots \\ \hat{X}_{im} \\ \vdots \\ \hat{X}_{Nm} \end{bmatrix} \leftrightarrow \hat{X}_{im} = S_i^p \hat{Z}_{im} + \bar{X}_i$

FIG. 3

1 Scaling Kernel $\phi(i,j)$    3 Wavelet Kernels $\psi^1(i,j), \psi^2(i,j), \psi^3(i,j)$ Multiscale decomposition produced by successive convolutions:

$$A_{2^{j+1}} = A_{2^j} * \phi \quad D^1_{2^{j+1}} = A_{2^j} * \Psi^1 \quad D^2_{2^{j+1}} = A_{2^j} * \Psi^2 \quad D^3_{2^{j+1}} = A_{2^j} * \Psi^3$$

$A_{2^{j+1}} : 2^{-(j+1)}$ Resolution Approximation of Image $$\left\{ D^K_{2^{j+1}} \right\} = A_{2^{j+1}} - A_{2^j} \ ; k = 1,2,3; j = 0,1,2,...,J$$

METHOD FOR CLUTTER REJECTION IN DIGITAL IMAGERY

FIELD OF THE INVENTION

The present invention generally relates to a method for attenuating stochastic effects in a digital image, and in particular, to a method for rejecting clutter in a digital image, such that structures in the digital image formerly obscured by such stochastic effects or clutter are more readily recognizable or detectable.

BACKGROUND OF THE INVENTION

Various methodologies have been utilized over the years to achieve detection of structures or targets (e.g., man-made structures, such as roads, buildings, vehicles, etc.) from space and/or airborne platforms. One such methodology is known as automatic data screening, which is a critical capability for imagery collection systems operating in a wide area search mode. Such automatic data screening is particularly useful for timely processing image data, especially in tactical situation and in view of the diminishing number of imagery analysts available to exploit the collected imagery. However, automatic data screening is, at times, problematic due to difficulties in maintaining a tolerable false alarm rate (e.g., false detection of objects/targets). Other methodologies for detection of structures have involved local methods such as small kernel convolvers or morphological filters. Unfortunately, these particular methodologies can produce unexpected results. And finally, still other methodologies depend upon repetitive target structure or convolved clutter, which is not typically present.

SUMMARY OF THE INVENTION

Accordingly, it is an object of the present invention to provide a method for detecting objects of interest (e.g., man-made structures, such as vehicles, buildings, roads, etc.) from digital imagery.

It is another object of the present invention to provide a method for attenuating clutter or stochastic effects in digital imagery to enhance recognition or detection of objects of interest.

It is a further object of the present invention to provide a method for timely decorrelating stochastic effects in a digital image while preserving the structure(s) in the digital image, such that the structure(s) are recognizable (e.g., through conventional automatic target recognition methodologies) and a tolerable false alarm rate is maintained.

It is yet another object of the present invention to provide a method for rejecting clutter to enable detection/recognition of structures/objects/targets utilizing a single digital image (e.g., a digital image from an optical, infrared, or synthetic aperture radar imaging system).

The method of the present invention achieves one or more of these objectives by applying several (i.e., two or more) transforms to a single digital input image. Applying selected transforms, each of which is designed to reveal obscured objects of interest, to the single digital input image tends to preserve the structure(s) in the image while acting on the clutter (i.e., stochastic effects) in distinctly different ways, such that the clutter is decorrelated across the several transformed images. Such transformed images may be combined to produce a filtered image, whereby objects of interest are more readily detectable/recognizable than with any one of the transforms alone. Advantageously, only a single digital image of an area of interest is required by the method of the present invention. As such, the method of the present invention is particularly useful due to limited imaging resources, and the fact that multiple looks at the same area of interest may not be possible within a given required time frame.

Generally, the method of the present invention is particularly suited for filtering clutter from a first digital input image, such that at least a first object, target or structure in the first digital input image, formerly obscured by the clutter, is detectable/recognizable. In one aspect of the present invention, such filtering may be accomplished in a timely manner by applying or performing at least first and second transforms to first digital image data corresponding to the first digital input image, the first digital image data being in the image intensity domain, performing an appropriate filtering operation to retain, in first and second transform domains, at least a portion of transform indication(s) corresponding or at least correlatable to the structure, applying to the remaining transform indications inverse first and second transforms, and processing the filtered first digital image data to produce a single filtered image and/or image data.

More specifically, in one embodiment, the method of the present invention includes the steps of applying or performing a first transform to transform first digital image data corresponding to a first digital input image from one of an optical, infrared and synthetic aperture radar imaging system into first transformed digital image data in the first transform domain, applying or performing a second transform to transform the first digital image data into a second transform domain, the first and second transformed digital image data in the first and second transform domains each having first and second transform indications corresponding or at least correlatable to at least the first object and the clutter, respectively, filtering the transformed digital image data by retaining at least a portion of the first transform indications corresponding to the first object in the first and second transform domain, applying or performing an inverse first transform to transform at least a portion of the first transform indication in the first transform domain into at least a first filtered indication from the first transform domain, in the image intensity domain, and applying or performing an inverse second transform to transform at least a portion of the first transform indication in the second transform domain into at least a first filtered indication from the second transform domain, in the image intensity domain. In this embodiment, the first and second transform domains are different. For example, the first transform domain may be the Karhunen-Loeve or Eigen space domain and the second transform domain may be the wavelet coefficient domain. For purposes of further enhancing attenuation of clutter, such that the structure(s) of the image is/are detectable/recognizable, the method may further include the steps of applying or performing a third transform to transform the first digital image data into a third transform domain, the third transformed digital image data in the third transform domain having first and second transform indications corresponding or at least correlatable to at least the first object and clutter, respectively, filtering the third transformed digital image data to alter and/or modify the spatial frequency of the clutter/stochastic effects and to increase the contrast of the structure(s)/non-stochastic feature(s) relative to the clutter/stochastic effects in the third transform domain, and applying or performing an inverse third transform to transform the modified/altered third transformed digital image data into modified image data in the image intensity domain. The method may further include the step of combining two or more of the first filtered indications in the image intensity domain to produce a first filtered image, or, alternatively, the step of processing two or more of the first filtered indications in the image intensity domain using a principal component analysis, the result of which is that at least the first object may be recognizable or detectable now that the clutter or stochastic effects have been decorrelated.

In another aspect, the method of the present invention is directed to enhancing the recognizability/detectability of structures in a digital image in a timely manner, the structures being initially obscured by clutter or stochastic effects. In this aspect of the present invention, the method generally includes the step of prescreening first digital image data corresponding to a first digital image for candidate objects or structures of interest, such that at least a first digital sub-image may be selected, the first digital sub-image including at least a first candidate object of interest. Such prescreening is especially useful for analyzing wide area images for objects or structures in a timely manner, especially since such wide area images can encompass hundreds of square nautical miles. More specifically, in one embodiment of this aspect of the invention, the method includes the steps of prescreening first digital image data corresponding to a first digital image for at least a first candidate object to select a first digital sub-image, the first digital sub-image including at least the first candidate object and being a portion of the first digital image, applying or performing a first transform to the first digital sub-image data to transform the first digital sub-image data in the image intensity domain into first transformed sub-image data in a first transform domain, the first transformed data including at least first and second separable transform indications in the first transform domain corresponding or at least correlatable to at least the first candidate object and the stochastic effects, respectively, in the image intensity domain, retaining at least a portion of the first transform indication in the first transform domain, performing a first inverse transform to transform at least the first transform indication in the first transform domain into at least a first filtered indication of the first digital sub-image data from the first transform domain, which may result in at least the first candidate object being recognizable due to the decorrelation of the clutter. The steps of applying another transform different than the first transform to the first digital sub-image data, retaining at least a portion of a transform indication corresponding to the first candidate object and applying an inverse transform different than the first inverse transform to a retained transform indication may be conducted on the first digital sub-image data to further enhance recognizability/detectability of at least the first candidate object.

Generally, the step of prescreening the first digital image data functions to focus the recognition/detection analysis upon a selected portion of the first digital image. In one embodiment, the prescreening step includes the steps of performing a high pass filter transform to transform the first digital image data in the image intensity domain into transformed image data in a transform domain having at least first and second transforms separable indications in the transform domain corresponding to at least the first candidate object and the stochastic effects, respectively, in the image intensity domain, discarding at least a portion of the second transform indication in the transform domain, performing an inverse transform to transform at least the first transform indication in the transform domain into at least a first filtered indication of a first processed digital image data from the transform domain, and thresholding in the image intensity domain the first processed digital data from the transform domain for at least the first candidate object having at least a first image intensity level to select at least the first digital sub-image, the first digital sub-image including the first filtered indication from the transform domain, whereby the first candidate object corresponds to the first filtered indication from the transform domain. In one embodiment, the high pass filter transform domain is the Karhunen Loeve domain (i.e., Eigen space domain).

As such, the method of the present invention is particularly useful in detecting, recognizing and/or classifying a wide variety of obscured objects/targets/structures using imagery from various types of digital imagery (e.g., optical, infrared and synthetic aperture radar images). In addition, synergistic effects among various types of imaging systems could be exploited. For example, the method of the present invention could be applied to X-band synthetic aperture radar imagery to produce more information about obscured targets/objects/structures which were detected by an ultra high frequency radar system used to cue the X-band synthetic aperture radar system.

DETAILED DESCRIPTION

FIGS. 1–7 illustrate the various features of the method of the present invention. Generally, the method of the present invention is directed to processing digital image data relating to images collected by an optical imaging system (e.g., real image data) and infrared imaging system (e.g., real image data) and/or a synthetic aperture radar imaging system (e.g., real or complex image data) for the purpose of enhancing the detectability and/or recognizability of one or more structures, objects or targets (e.g., land, air, sea-based vehicles, buildings, roads, or other man-made structure). In this regard, the method of the present invention is adapted to improve detection of obscured structures. For example, the method may be utilized for foliage penetration enhancement for X-band synthetic aperture radar systems since the higher center frequency of the X-band typically suffers attenuation by the foliage which reduces detected target or object returns.

Generally, the method of the present invention involves the processing of some given image data, real or complex, where a large amount of stochastic corruption (i.e., clutter) inhibits signals of interest, such as discrete signals, from being readily evident or recognizable to users of the image data. More specifically, the method of the present invention is directed to processing digital image data from an optical, infrared and/or synthetic aperture radar imaging system to detect and/or recognize a cultural object or structure which is obscured by clutter. In this regard, the objective of the methodology is to separate desirable signals or data (e.g., a signal from a structure) in a first image data corresponding to a first digital image from undesirable signals or data (e.g., corruption signals corresponding to obscuration) in the first image data, and to retain the desirable signals while rejecting the undesirable signals. As such, the method of the present invention functions to de-correlate stochastic effects while preserving the structure(s) of the digital image. Advantageously, and of particular importance, for purposes of de-correlating such stochastic effects, for a given area of interest, only one image is necessary, as opposed to multiple images of the area of interest. Such capability is especially useful for wide area search modes of imagery collection systems in view of timeliness concerns in tactical situation and in view of the dimensioning number of image analysts available to exploit what imagery is collected.

Figure 1:
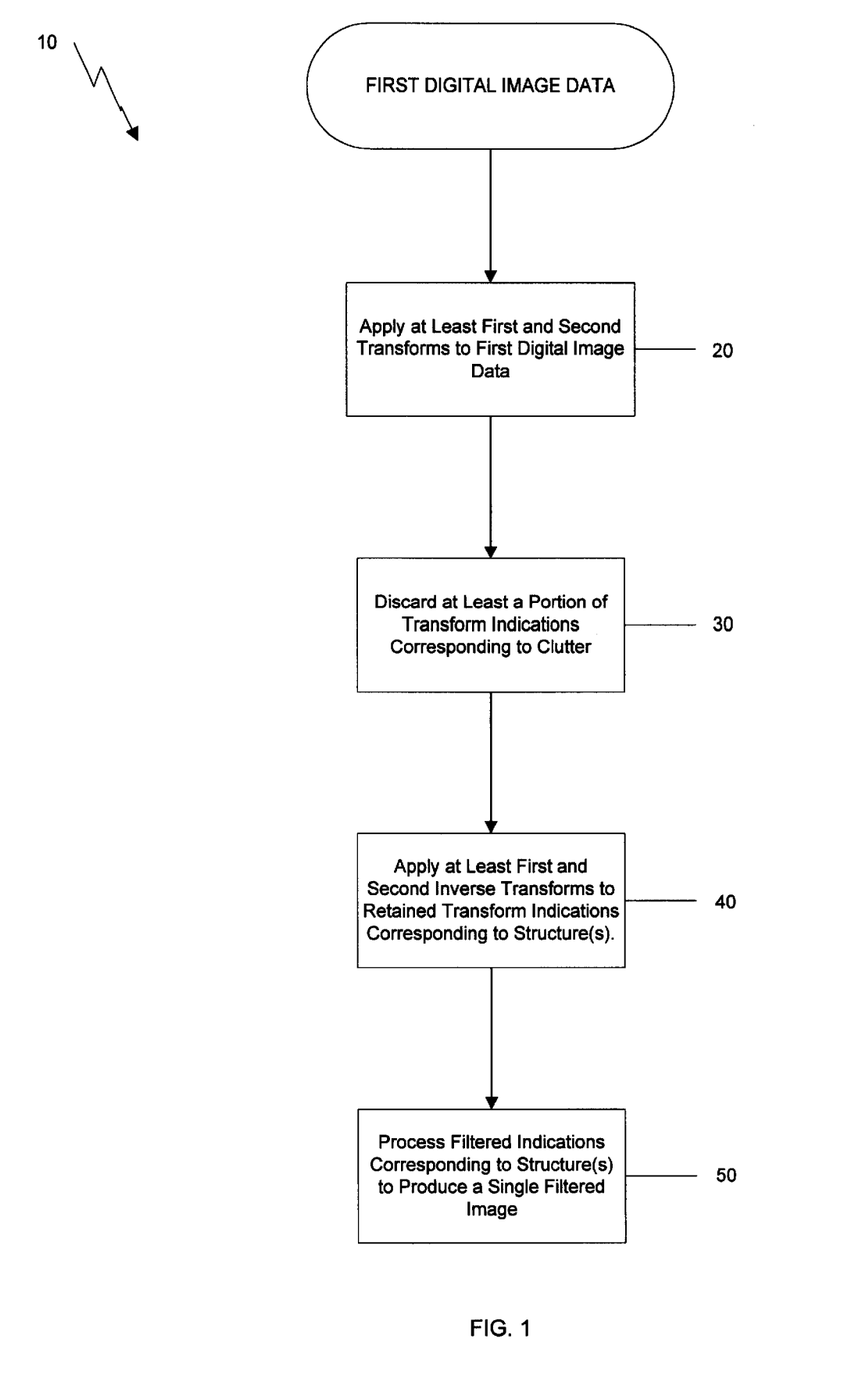
FIG. 1 is a flow chart illustrating one embodiment of the method of the present invention.

Referring to FIG. 1, the method 10 of the present invention generally includes the step of 20 applying or performing first and second transforms to transform the first digital image data into first and second transform domains, respectfully, the step 30 of discarding at least a portion of the transform indications in the first and second transform domains which correspond and/or at least correlate to clutter or stochastic effects, the step 40 of applying or performing inverse first and second transforms to transform the retained transformed indications corresponding and/or at least correlatable to a structure or object into filtered indications in the first and second transformed domains, respectfully (e.g., in the image intensity domain), and from the step 50 of processing the filtered indications corresponding to objects or structures to produce a single filtered image in the image intensity domain.

Figure 2:
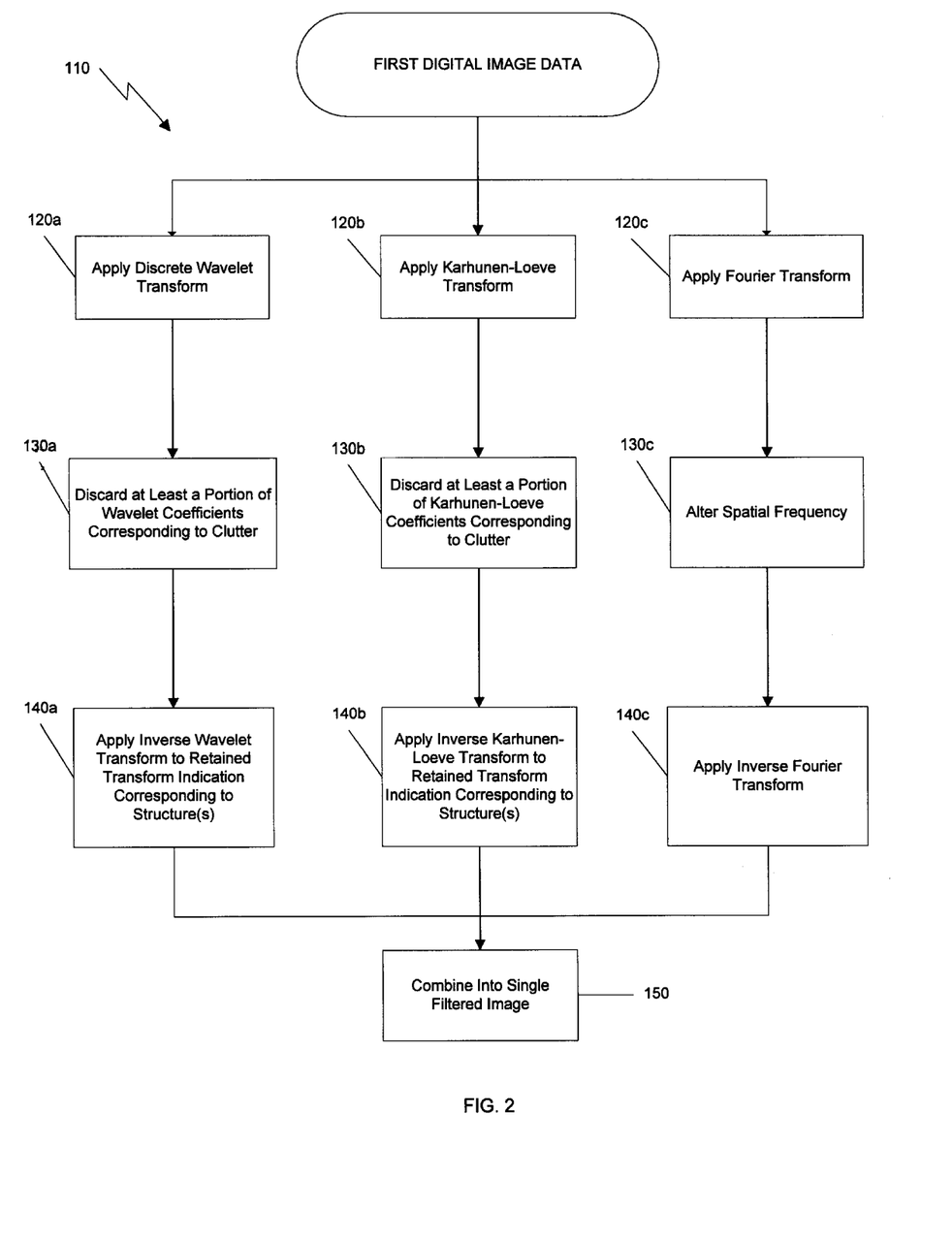
FIG. 2 is a flow chart illustrating another embodiment of the method of the present invention.

In one embodiment, illustrated in FIG. 2, the method includes the steps 120a, 120b, 120c of separately applying to the first digital image data a wavelet transform (e.g., a discrete wavelet transform), a Karhunen-Loeve transform (e.g., a discrete low order Karhunen-Loeve transform) and a Fourier transform (e.g., a discrete two-dimensional Fourier transform), respectfully, to transform the first digital image data into the wavelet coefficient domain, the Karhunen-Loeve or eigenspace domain and the spatial frequency domain, respectfully. Applying a discrete wavelet transform to the first digital image data transforms the first digital image data into (e.g., the Daubechies four coefficient wavelets) the wavelet coefficient domain, whereby wavelet coefficients corresponding or at least correlatable to clutter or stochastic effects are identifiable or locatable within the wavelet coefficient domain. For purposes of filtering the transformed digital data in the wavelet coefficient domain, the methodology further includes the step 130a of discarding at least a portion of the wavelet coefficients which correspond to the clutter. In particular, a low frequency region of wavelet coefficients may be discarded, such low frequency region corresponding to the clutter, while the high frequency region of wavelet coefficients which correspond to objects or structures within the digital image is retained. In this embodiment, selected portions of an upper left region of an N by N wavelet coefficient data set may be zeroed to discard wavelet coefficients which correspond to clutter (which will be described in more detail hereinbelow). Thereafter, the method includes the step 140a of applying an inverse wavelet transform to the retained or remaining wavelet coefficients or transform indications in the wavelet coefficient domain into the image intensity domain such retained wavelet coefficients substantially corresponding to and/or correlatable to structures or objects within the first data image.

Referring to FIG. 2, in this embodiment, the method further includes the step 130b of discarding Karhunen-Loeve coefficients or eigenvectors which correspond to clutter in the Karhunen-Loeve or eigenspace domain. More specifically, for purposes of filtering the transformed digital image data in the eigenspace or Karhunen-Loeve domain to retain Karhunen-Loeve coefficients corresponding to the structure while discarding Karhunen-Loeve coefficients corresponding to clutter, the step 130b of discarding comprises discarding the dominant eigenvector, which corresponds or is at least correlatable to the clutter. In this regard, Karhunen-Loeve coefficients associated with the minor eigenvectors are retained, since the clutter in a synthetic aperture radar pixel intensity image is projected largely on the dominant eigenvector. By eliminating the Karhunen-Loeve coefficients associated with the dominant eigenvector, clutter is attenuated considerably more than the structure of the image. Thereafter, the method includes a step 140b of applying an inverse Karhunen-Loeve transform to the retained transform indications (e.g., minor eigenvectors) which correspond or at least correlate to a structure(s) or object(s) within the image. Such inverse KarhunenLoeve transform transforms the retained Karhunen-Loeve or eigenvectors from the Karhunen-Loeve domain back into image intensity domain.

In this embodiment, illustrated in FIG. 2, the method further includes a step 130c of filtering the transformed first digital image data in the spatial frequency domain by altering the spatial frequency of the clutter or stochastic effects, such that the spatial frequency of the clutter is decreased while the spatial frequency of the non-stochastic effects (e.g., structures) remains relatively unaltered. In this embodiment, in order to accentuate the non-stochastic features relative to the stochastic effects, the step of 130c of altering the includes the step of substituting a unity value (e.g., Pseudo Modulus Constant, Butterworth Surface, etc.) for the spatial frequencies of the amplitude of the non-stochastic feature signature and the stochastic effect signal. Thereafter, the method further includes the step 140c of applying an inverse Fourier transform to transform the spatial frequency of the phases of the non-stochastic feature signature and the stochastic effect signal, along with unity values of the spatial frequencies of the amplitudes of the non-stochastic feature signature and the stochastic effects signal into modified/altered digital image data in the image intensity domain.

More specifically, the digital input image "d" is input to a two-dimensional discrete Fourier transform ("DFT") with "z" being the digital complex output, which is then normalized. An inverse two-dimensional DFT is then applied to produce the output. For example, for a complex synthetic aperture image denoted as "z":

$z = x + jy;$ where each of "x" and "y" is a real number, "x" being the in-phase component and "y" being the quadrature component; and "j" is defined by:

$j^2 = -1$

The amplitude, "$\|Z\|$" of the first complex image (e.g., first amplitude data of the first image) may be obtained by taking the square root of the in-phase component, squared (i.e., $x^2$) plus the quadrature component, squared (i.e., $y^2$). The phase of the complex image is the standard four quadrant inverse tangent of the ratio "y/x" ranging from $-180°$ to $+180°$, for "x" non-zero. The definition of a two-dimensional discrete Fourier transform is provided hereinbelow for an "N by N" input data set:

$$D(u, v)=(1/N)\Sigma\Sigma d(x, y)(\exp[-j2\pi(ux+vy)/N]),$$

where $d(x, y)$, $x=0, \ldots, N-1$, $y=0, \ldots, N-1$ and the double summation is over $u=0, \ldots, N-1$, $v=0, \ldots, N-1$.

And, every complex value "z" output from the two-dimensional Fourier transform is transformed to "$z/\|z\|$", where "$\|z\|$" is defined as the amplitude of "z". In this regard, normalization is used to defeat/reduce clutter by virtue of the whitening effect the normalization has on the clutter.

Figure 3:
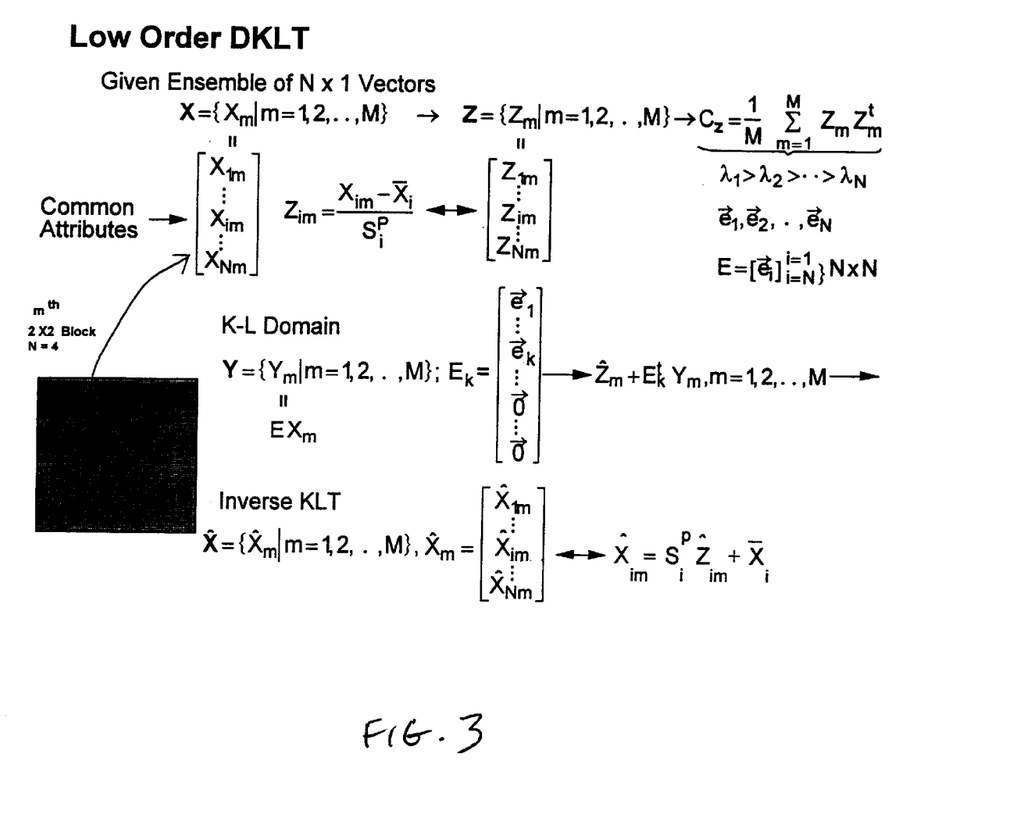
FIG. 3 is a mathematical representation of a portion of the methodology illustrated in FIG. 2, showing the steps of applying a discrete Karhunen-Loeve ("K-L") transform to image data, filtering in the K-L domain and applying an inverse discrete Karhunen-Loeve transform.

For the low order discrete Karhunen-Louve transform (DKLT), the input to the process is an ensemble "X" of $N \times 1$ vectors which are standardized to zero mean and unit variance, denoted as Z, illustrated in FIG. 3. The Correlation Matrix, "$C_z$" is computed as indicated hereinbelow with the superscript "t" indicating matrix transpose. The resulting eigenvalues and eigenvectors of $C_z$ are denoted by $\lambda_1, \lambda_2, \ldots, \lambda_N$, and $e_1, e_2, \ldots, e_N$, resp., where "E" denotes the matrix composed of the eigenvectors. The input ensemble "X" is now transformed to the Karhunen-Louve domain as indicated hereinbelow, denoted "Y". In order to filter the data, a modified eigenvector matrix "$E_k$" is formed which is comprised of the first "k" with the zero vector, where the dominant eigenvector is discarded. Next, the process is reversed to return to the standardized domain of "Z", then finally transformed to the original domain of "X", donated by "X" with a "caret" above which is the filtered result.

Figure 4:
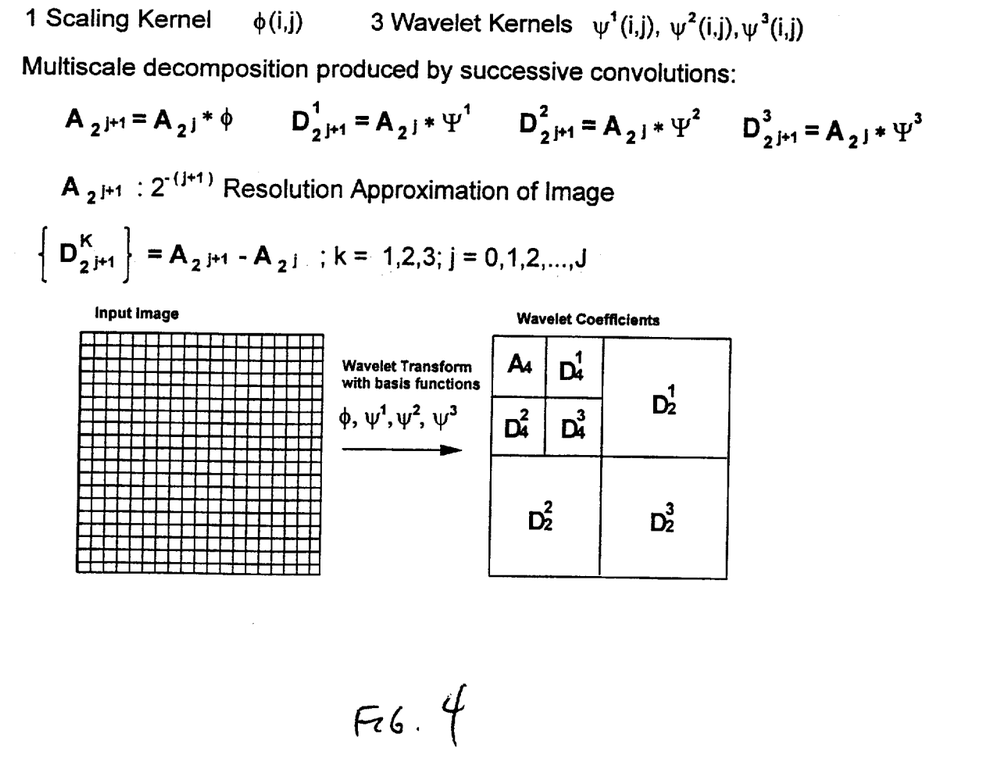
FIG. 4 is a mathematical representation of another portion of the methodology illustrated in FIG. 2, showing the steps of applying a discrete wavelet transform to image data, filtering in the wavelet coefficient domain and applying an inverse wavelet transform.

As illustrated in FIG. 4, for the orthogonal wavelet representation of imagery, the $N \times N$ input digital image is "$A_1$", with wavelet kernels as indicated, which are $N \times N$ invertible matrices to be multiplied recursively as shown starting with the input image "$A_1$" to produce different effects. In the wavelet coefficient array, all of the "$D^1$" subarrays are the result of filtering the preceding subarray so as to preserve horizontal structure, all the "$D^2$" subarrays are the result of filtering the preceding subarray so as to preserve diagonal structure, and all the "$D^3$" subarrays are the result of filtering the preceding subarray so as to preserve vertical structure. Filtering is accomplished by, for example, zeroing "$A_4$" (e.g., the dc region coefficients), illustrated in FIG. 4, then reversing the process to return to the original domain of the input digital image "$A_1$".

Figure 5:
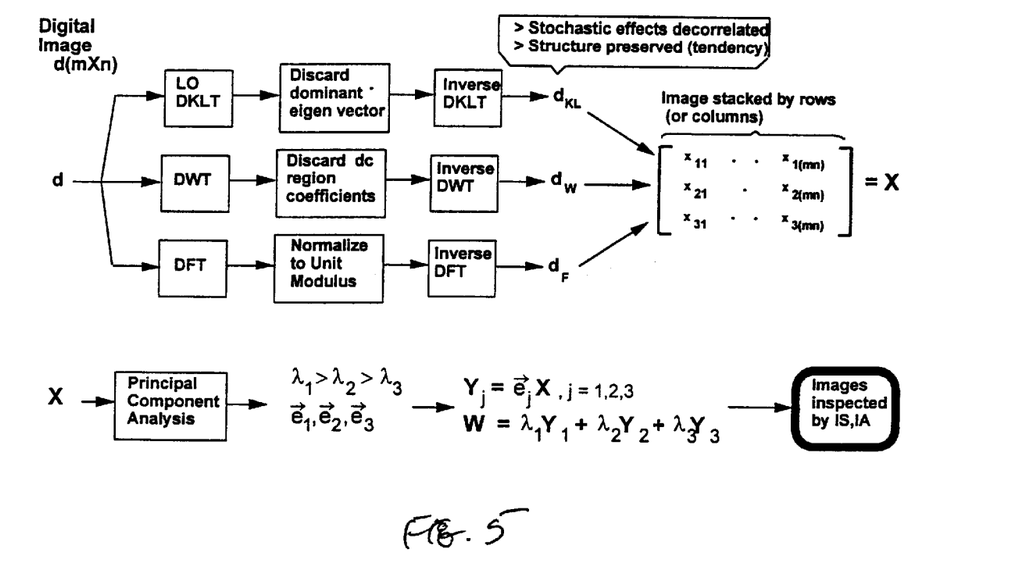
FIG. 5 is a mathematical representation of another embodiment of the method of the present invention, using a principal component analysis.

Thereafter, the method further includes the step 150 of combining the filtered indications in the image intensity domain to produce a first filtered image, as illustrated in FIG. 2. In an alternative embodiment, illustrated in FIG. 5, the filtered indications in the image intensity domain are processed using a principle component analysis, the result of which is that an object may be recognizable or detectable in view of the decorrelation of the clutter or stochastic effects in the original, first digital image data. A complete input digital image "d" is filtered after applying all three transforms (i.e., low order discrete Karhunen-Louve transform ("LO DKLT"), discrete wavelet transform ("DWT") and discrete Fourier transform ("DFT")), substantially as described hereinabove, with the resulting digital image outputs "$d_{KL}$", "$d_W$", and "$d_F$" being the basis for a matrix "X" which is to be used for principal component analysis, as illustrated in FIG. 5. The result of the principal component analysis on the matrix "X" produces the eigenvalues $\lambda_1, \lambda_2, \lambda_3$, and the eigenvectors $e_1, e_2, e_3$, which are combined for exploitation into digital images "Y" and "W".

In another embodiment, for purposes of enhancing the recognizability/detectability of structures in a digital image in a timely manner, the method of the present invention initially includes the step of pre-screening first digital image data corresponding to a first digital image for candidate objects or structures of interest, such that a first sub-image is selectable, the selected first sub-image including a first candidate object of interest. Thereafter, the method includes the step of filtering clutter from the selected first sub-image. More specifically, and referring to FIG. 6, the method 310 includes the step 322 of applying a first transform to the first digital image data to transform the first digital image data from the image intensity domain into a first transform domain, the step 332 of discarding at least a portion of the transform indication in the first transform domain which corresponds to clutter or stochastic effects, the step 342 of applying an inverse first transform to the remaining or retained transform indications which correspond to structure and, the step 370 of selecting sub-image data within the filtered first digital image data, the sub-image data including a first candidate object or structure of interest. In this embodiment, the step 322 of applying the first transform includes the step of applying a Karhunen-Loeve transform to the first digital image data. In this regard, the step 332 of discarding at least a portion of the transform indication which corresponds to clutter includes the step of discarding the Karhunen-Loeve coefficients associated with the dominant eigenvector to retain the Karhunen-Loeve coefficients associated with the minor eigenvectors. As such, the step 342 of applying an inverse first transform to the retained transform indications includes a step of applying an inverse Karhunen-Loeve transform to at least the minor eigenvectors, which correspond to structure (e.g., the first candidate object) within the image. Such pre-screening is especially useful in wide area searches for coarse screening to thereby select the first sub-image of interest.

Figure 6:
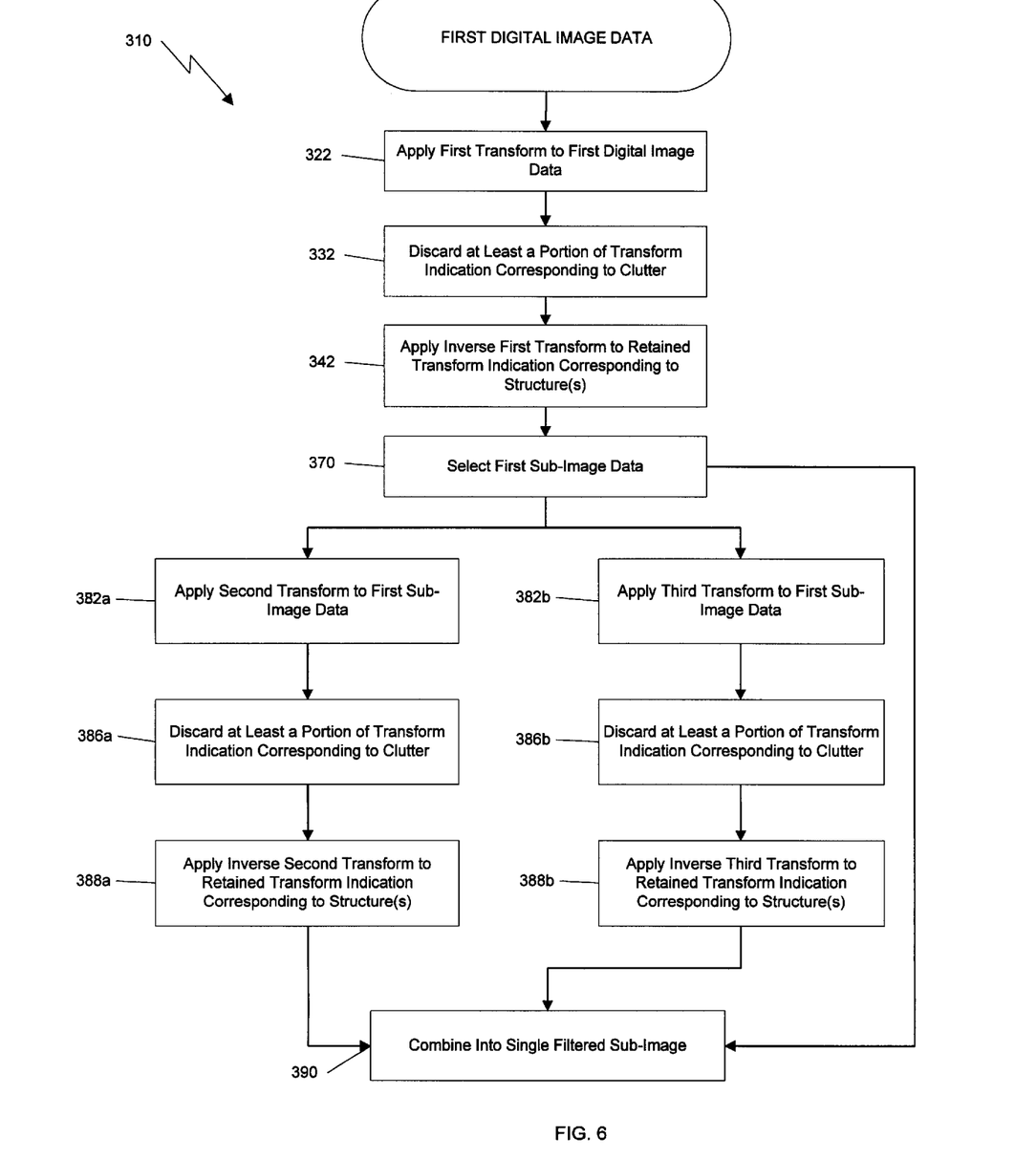
FIG. 6 is a flow chart illustrating another embodiment of the method of the present invention.

Thereafter, and as illustrated in FIG. 6, the selected first sub-image data is filtered using additional high pass filter transforms. In particular, the method 310, illustrated in FIG. 6, further includes the steps 382a of applying a second transform to the selected first sub-image data, the step 386a of discarding at least a portion of the transformed indication in the second transformed domain which corresponds at least to clutter, and the step 388a of applying an inverse second transform to the retained transformed indications which correspond at least to structure to transform such data back into the image intensity domain from the second transformed domain. The method 310 further includes the step 382b of applying a third transform to the selected first sub-image data, the step 386b of discarding at least a portion of the transform indication corresponding at least to clutter in the third transform domain and the step 388b of applying an inverse third transform to the retained transform indication corresponding at least to the first candidate object or structure to transform such from the third transform domain back into the image intensity domain. In this embodiment, the second transform is a Fourier transform and the third transform is a wavelet transform, substantially described hereinabove with respect to other embodiments. Thereafter, the filtered sub-image data from the Karhunen-Loeve transform processing, the wavelet transform processing and the Fourier transform processing are combined in step 390 into a single filtered sub-image, such that the detectability/recognizability of at least the first candidate object/structure of interest is enhanced. In order to further enhance such recognizability/detectability of at least the first candidate object, the method may further include using Poisson Screening, a Newton filter and/or a shape discriminator to produce a list of candidate non-clutter objects (e.g., the first candidate object/structure of interest) for further use.

Figure 7:
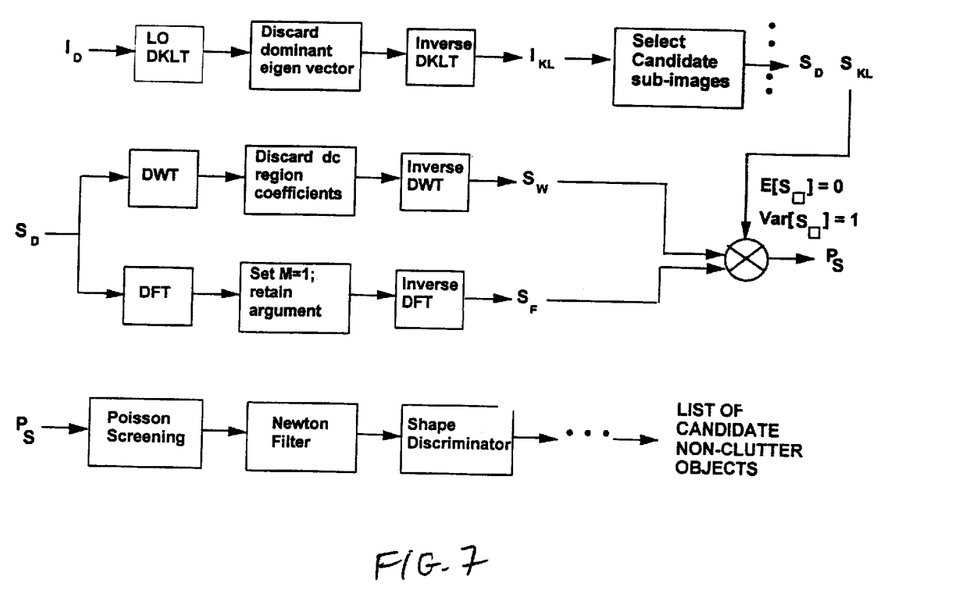
FIG. 7 is a mathematical representation of the flow chart illustrated in FIG. 6.

This special case of automatic data screening is further illustrated in the flow diagram of FIG. 7, which depicts pre-screening with the low order discrete Karhunen-Louve transform ("DKLT"), then coupled with the wavelet transform and the Fourier transform to achieve the multiple transform effect. "$I_D$" is the input digital intensity image which is first input to a discrete Karhunen-Louve transform, then is effectively high pass filtered by discarding the dominant eigenvector, with "$I_{KL}$" being the result of the inverse DKLT. "$I_{KL}$" may be then screened for candidate objects of interest by standard thresholding techniques. For any subimage "$S_{KL}$" of "$I_{KL}$" which is found with candidate objects of interest, the corresponding sub-image "$S_D$" of "$I_D$" is selected for input to the discrete wavelet transform ("DWT") and the discrete Fourier transform ("DFT") to be effectively high pass filtered as indicated in the flow diagram with the resulting output sub-images being denoted by "$S_W$" and "$S_F$". The three sub-images "$S_{KL}$", "$S_W$" and "$S_F$", are then combined as indicated after being standardized to zero mean, and unit variance. "E[ ]" and "Var[ ]" indicate the usual expectation operator and variance operator as found in elementary textbooks. The resulting combined digital intensity image $P_S$ is then further processed in a variety of ways (e.g., Poisson Screening, Newton filter, shape discriminator, etc.).

The foregoing description of the present invention has been presented for purposes of illustration and description. Furthermore, the description is not intended to limit the invention to the form disclosed herein. Consequently, variations and modifications commensurate with above teachings, and the skill or knowledge of the relevant art, are within the scope of the present invention. The embodiments described hereinabove are further intended to explain best modes known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

What is claimed is:

1. A method for reducing clutter in a first digital image, the first digital image corresponding to first digital image data and including at least a first candidate object of interest obscured by the clutter, wherein the first digital image data is in an image intensity domain, said method comprising the steps of:

performing first and second transforms to transform the first digital image data in the image intensity domain into first and second transformed image data in first and second transform domains, respectively, wherein first and second transform indications of each of the first and second transformed image data corresponding to at least the first candidate object of interest and the clutter, respectively, in the first and second transform domains are separable;

filtering at least a portion of the second transform indications corresponding to the clutter in the first and second transform domains;

performing inverse first and second transforms on at least the first transform indications in the first and second transform domains, respectively, to transform at least the first transform indications into first filtered indications in the image intensity domain, the first filtered indications corresponding to at least the first candidate object of interest; and performing one of first and second steps, said first step comprising the step of combining the first filtered indications in the image intensity domain to produce a first filtered image, said second step comprising processing the first filtered indications in the image intensity domain using a principal component analysis.

2. A method as claimed in claim 1, wherein the first transform domain is an Eigenspace domain, said performing the first transform step comprising performing a discrete Karhunen-Loeve transform to transform the first digital image data in the image intensity domain into the Eigenspace domain.

3. A method as claimed in claim 2, wherein the first and second transform indications in the Eigenspace domain comprise first and second Karhunen-Loeve coefficients, respectively, wherein the second Karhunen-Loeve coefficient is dominant.

4. A method as claimed in claim 3, wherein said filtering step comprises the step of retaining, in the Eigenspace domain, at least a portion of the first Karhunen-Loeve coefficient corresponding to at least the first candidate object of interest.

5. A method as claimed in claim 2, wherein said performing the inverse first transform step comprises the step of performing an inverse discrete Karhunen-Loeve transform to transform the first transform indication in the Eigenspace domain into the first filtered indication in the image intensity domain.

6. A method as claimed in claim 1, wherein the second transform domain is a wavelet coefficient domain, said performing the second transform step comprising the step of performing a discrete wavelet transform to transform the first digital image data in the image intensity domain into the wavelet coefficient domain.

7. A method as claimed in claim 6, wherein the first and second transform indications in the wavelet coefficient domain comprise first and second wavelet coefficients in the wavelet coefficient domain, respectively, wherein the second wavelet coefficient has a frequency lower than the first wavelet coefficient.

8. A method as claimed in claim 7, wherein said filtering step comprises the step of retaining, in the wavelet coefficient domain, at least a portion of the first wavelet coefficient.

9. A method as claimed in claim 6, wherein said performing the inverse second transform step comprises the step of performing an inverse discrete wavelet transform to transform the first transform indication in the wavelet coefficient domain into the first filtered indication in the image intensity domain.

10. A method as claimed in claim 1, wherein the second transform domain is a spatial frequency domain, said performing the second transform step comprising the step of applying a two-dimensional Fourier transform to transform the first digital image data into second transformed image data in the spatial frequency domain, the second transformed image data having a first amplitude and a first phase.

11. A method as claimed in claim 10, wherein said filtering step comprises the step of processing the second transformed image data to retain the first phase of the second transformed image data and to set the first amplitude of the second transformed image data to unity to produce modified transformed image data, wherein the spatial frequency corresponding to the clutter is altered and the contrast corresponding to at least the first candidate object of interest relative to the clutter is increased from a first contrast level to a second contrast level.

12. A method as claimed in claim 11, wherein said performing the inverse second transform step comprises the step of applying an inverse two-dimensional Fourier transform to the modified transformed image data in the spatial frequency domain to transform the modified transformed image data into modified image data.

13. A method as claimed in claim 12, further comprising the step of:

detecting the modified image data to transform the modified image data into the image intensity domain, the modified image data in the image intensity domain having at least an amplitude.

14. A method as claimed in claim 1, wherein said combining step comprises one of the steps of adding and multiplying at least the first filtered indications in the image intensity domain to produce the first filtered image.

15. A method as claimed in claim 1, wherein at least the first candidate object of interest is recognizable to users of the image data.

16. A method for attenuating stochastic effects in a first digital image, the first digital image corresponding to first digital image data and having a structure correlated with the stochastic effects, the structure including at least a first candidate object of interest, said method comprising the steps of:

prescreening the first digital image data to select at least a first digital sub-image having first digital sub-image data, wherein the first digital sub-image includes at least the first candidate object of interest;

performing at least a first transform to transform the first digital sub-image data in the image intensity domain into first transformed sub-image data in a first transform domain, wherein the first transformed sub-image data includes at least first and second transform indications in the first transform domain corresponding to at least the first candidate object of interest and the stochastic effects, respectively, in the image intensity domain, said first and second transform indications being separable;

discarding at least a portion of the second transform indication in the first transform domain; and performing an inverse first transform to transform at least the first transform indication in the first transform domain into at least a first filtered indication of the first digital sub-image data from the first transform domain.

17. A method as claimed in claim 16, wherein said prescreening step comprises the steps of:

performing a second transform to transform the first digital image data in the image intensity domain into second transformed image data in a second transform domain, wherein the second transformed image data includes at least first and second transform indications in the second transform domain corresponding to at least the first candidate object of interest and the stochastic effects, respectively, in the image intensity domain, the first and second transform indication in the second transform domain being separable;

discarding at least a portion of the second transform indication in the second transform domain;

performing an inverse second transform to transform at least the first transform indication in the second transform domain into at least a first filtered indication of a first processed digital image data from the second transform domain;

thresholding in the image intensity domain the first processed digital data from the second transform domain for at least the first candidate object of interest having at least a first image intensity level to select at least the first digital sub-image, the first digital sub-image including the first filtered indication from the second transform domain, wherein the first candidate object of interest corresponds to the first filtered indication from the second transform domain.

18. A method as claimed in claim 17, wherein the second transform domain is an Eigenspace domain, said performing the second transform step comprising performing a discrete Karhunen-Loeve transform to transform the first digital image data in the image intensity domain into the Eigenspace domain.

19. A method as claimed in claim 17, wherein said discarding step comprises the step of retaining at least a portion of the first transform indication in the second transform domain.

20. A method as claimed in claim 17, wherein the second transform domain is an Eigenspace domain, said performing the inverse second transform comprising performing an inverse discrete Karhunen-Loeve transform to transform at least the first transform indication in the Eigenspace domain into at least the first filtered indication of the first digital image data from the Eigenspace domain.

21. A method as claimed in claim 16, further comprising the steps of:

applying a two-dimensional Fourier transform to the first digital sub-image data to transform the first digital sub-image data into second transformed sub-image data in the spatial frequency domain, the second transformed sub-image data having a first amplitude and a first phase;

processing the second transformed sub-image data to retain the first phase of the second transformed sub-image data and to set the first amplitude of the second transformed sub-image data to unity to produce modified transformed sub-image data, wherein the spatial frequency corresponding to the stochastic effects signals is altered and the contrast corresponding to at least the first object relative to the stochastic effects signals is increased from a first contrast level to a second contrast level;

applying an inverse two-dimensional Fourier transform to the modified transformed sub-image data in the spatial frequency domain to transform the modified transformed sub-image data into modified sub-image data;

detecting the modified sub-image data to transform the modified sub-image data into the image intensity domain, the modified sub-image data in the image intensity domain having at least an amplitude.

22. A method as claimed in claim 16, further comprising the step of:

combining the first filtered indications to produce at first filtered sub-image, wherein at least the first candidate object of interest is recognizable.

23. A method as claimed in claim 16, further comprising the steps of:

processing at least the first filtered sub-image data corresponding to the first filtered sub-image using at least one of a Poisson screening technique, a Newton filter and a shape discriminator.

24. A method as claimed in claim 16, wherein at least the first candidate object of interest is recognizable to users of the image data.

\* \* \* \* \*

UNITED STATES PATENT AND TRADEMARK OFFICE
CERTIFICATE OF CORRECTION

PATENT NO.      : 6,377,206 B1
DATED           : April 23, 2002
INVENTOR(S)     : Petty It is certified that error appears in the above-identified patent and that said Letters Patent is hereby corrected as shown below:

Title page,
Item [56], References Cited, OTHER PUBLICATIONS, insert -- Rosenfeld and Kak; Digital Picture Processing; 1982; pp. 126-131. --

Signed and Sealed this

Twenty-fourth Day of September, 2002

Attest:

JAMES E. ROGAN
Attesting Officer    Director of the United States Patent and Trademark Office